United States Patent
Thirlaway et al.

(10) Patent No.: US 9,499,048 B2
(45) Date of Patent: Nov. 22, 2016

(54) SUPPORT ARM ASSEMBLY

(75) Inventors: George Thirlaway, Coventry (GB); Steve Checkley, Coventry (GB); Adam Grant, Coventry (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 0 days.

(21) Appl. No.: 14/238,857

(22) PCT Filed: Aug. 17, 2012

(86) PCT No.: PCT/EP2012/003502
§ 371 (c)(1),
(2), (4) Date: Apr. 14, 2014

(87) PCT Pub. No.: WO2013/023791
PCT Pub. Date: Feb. 21, 2013

(65) Prior Publication Data
US 2014/0238515 A1    Aug. 28, 2014

(30) Foreign Application Priority Data
Aug. 17, 2011    (GB) .................................. 1114128.0

(51) Int. Cl.
*B60K 15/07* (2006.01)
*B60K 15/03* (2006.01)
(Continued)

(52) U.S. Cl.
CPC ............. *B60K 15/077* (2013.01); *B60K 15/03* (2013.01); *B60K 15/073* (2013.01); *B60K 2015/03144* (2013.01); *Y10T 137/86228* (2015.04); *Y10T 137/86348* (2015.04)

(58) Field of Classification Search
CPC .. B60K 15/077; B60K 15/073; B60K 15/03; B60K 2015/03144; Y10T 137/86348; Y10T 137/86228

USPC ............. 220/4.12, 4.14, 562, 905, 581, 582; 137/590, 592, 565.17, 587
See application file for complete search history.

(56) References Cited

U.S. PATENT DOCUMENTS 2,427,059 A * 9/1947 Landon ...................... F23D 5/14
                                                                137/390
4,466,386 A * 8/1984 Silva .......................... 123/25 B
(Continued)

FOREIGN PATENT DOCUMENTS

| EP | 0532427 A1 | 3/1993 |
| EP | 1090795 A1 | 4/2001 |

(Continued)

OTHER PUBLICATIONS

International Search Report for International Application No. PCT/EP2012/003502 mailed Nov. 22, 2012.
(Continued)

*Primary Examiner* — Robert J Hicks
*Assistant Examiner* — Kareen Thomas
(74) *Attorney, Agent, or Firm* — Carlson, Gaskey & Olds (57) ABSTRACT

The present application relates to a support arm assembly (39) for mounting in a fuel tank (1). A support arm (43) is provided to support a fuel transfer tube (17) for transferring fuel to a fuel pump (11). A support foot (49) is provided to support the support arm (43) at a predetermined position within the fuel tank (1). The support foot (49) biases the support arm assembly (39) against a roof of the fuel tank (1). The present application also relates a support foot (49) for mounting in a support arm assembly (39). The combination of a fuel tank (1) and the support arm assembly (39) is also envisaged.

19 Claims, 10 Drawing Sheets

(51) Int. Cl.
*B60K 15/077* (2006.01)
*B60K 15/073* (2006.01)

(56) References Cited

U.S. PATENT DOCUMENTS

| | | |
|---|---|---|
| 4,750,513 A | 6/1988 | Griffin et al. |
| 7,455,190 B2 | 11/2008 | Potter et al. |
| 2004/0086331 A1 | 5/2004 | Iwamoto |
| 2006/0102634 A1 | 5/2006 | Potter et al. |
| 2006/0246819 A1* | 11/2006 | Byers ............... A63H 17/262 446/431 |
| 2007/0094755 A1 | 4/2007 | Jeon |
| 2008/0149199 A1 | 6/2008 | Bleuel |
| 2009/0230133 A1 | 9/2009 | Takeuchi et al. |
| 2010/0051369 A1 | 3/2010 | Kuramochi et al. |
| 2010/0116366 A1 | 5/2010 | Gattozzi et al. |
| 2011/0035928 A1 | 2/2011 | Mbog et al. |
| 2011/0209789 A1* | 9/2011 | Murabayashi ......... B60K 15/03 137/899 |

FOREIGN PATENT DOCUMENTS

| | | |
|---|---|---|
| GB | 1144811 A | 3/1969 |
| JP | 2010070097 A | 4/2010 |
| JP | 2010112495 A | 5/2010 |
| WO | 2009125008 A1 | 10/2009 |

OTHER PUBLICATIONS

Search and Examination Report under Sections 17 and 18(3) for Application No. GB1114128.0 dated Dec. 15, 2011.
Chinese Search Report for Application No. 201280051141.5 dated Oct. 12, 2015.

* cited by examiner

SUPPORT ARM ASSEMBLY

TECHNICAL FIELD

The present application relates to a fuel tank assembly and particularly, but not exclusively, to a support arm assembly for mounting in a fuel tank. The fuel tank is typically for use in a motor vehicle. Aspects of the invention relate to a support arm assembly, to a support foot, to a fuel tank, to a kit and to a vehicle.

BACKGROUND

It is known from US 2008/0149199 to provide an articulated boom for positioning a fuel line in a saddle-type fuel tank. The boom has a spring-loaded mechanism which enables the boom to pivot from a first pressure-loaded position to a second pressure-loaded position. A support member is deployed under the action of the spring-loaded mechanism to engage the roof of the fuel tank. The mechanism also presses the distal end of the boom against the floor of the fuel tank thereby fixing the boom in position.

The spring-loaded mechanism locates the distal end of the articulated boom against the floor of the fuel tank. However, this may deform the end of the boom through which fuel enters for conveyance to a swirl chamber. Any such deformation could affect the supply of fuel. Also, since the boom is biased against the floor of the fuel tank, loads applied to the fuel tank may be transferred directly to the articulated boom. Deflection of the tank may affect the integrity of the seal formed at the base of the boom.

SUMMARY

According to an aspect of the present invention there is provided a support arm assembly for mounting in a fuel tank, the support arm assembly comprising a support arm carrying a fuel transfer tube for transferring fuel to a fuel pump and a support foot for cooperating with the fuel tank to support the support arm at a predetermined position within the fuel tank, wherein the support foot biases the support arm assembly against a roof of the fuel tank.

The support foot may absorb operational loads from the fuel tank thereby helping to reduce the transferal of loads to the support arm.

The support foot could be spring-biased. For example, the support arm assembly may comprise a spring for biasing the support foot to a predetermined orientation. Alternatively (or in addition), the support foot may be formed from a resilient material. A resilient support foot could be fixedly mounted in a predetermined orientation.

The support arm assembly could be fixedly mounted in the fuel tank. However, in certain embodiments, the support arm assembly comprises a connector for pivotally mounting the support arm assembly in the fuel tank.

The support foot could be formed with integrally with the support arm. Alternatively, the support foot is formed separately and then mounted on the support arm. This modular approach enables the support art assembly to be tailored for different applications. Support feet having different characteristics and/or dimensions may be used for different fuel tanks or to alter the specification of the same fuel tank (for example to change the fuel fill height and, therefore, the effective volume of the fuel tank). The support foot could be interchangeable.

A retainer can be provided on the support arm for mounting the support foot. The retainer can mount the support foot in a fixed orientation on the support arm. The retainer may comprise a clasp or a latch to secure the support foot in position. For example, the support arm and/or the support foot may comprise a resilient member. Alternatively (or in addition), the retainer may comprise a mechanical fastener, such as a screw.

The support foot may be arranged operatively to engage a sidewall or a floor of the fuel tank.

The support foot can have a flat or curved contact surface for engaging the fuel tank.

The fuel transfer tube may have a fuel inlet. A filter may be provided over the end fuel inlet. A guide member may be provided on the support arm to support the fuel transfer tube and/or the filter. The guide member and/or the resilience of the fuel transfer tube may bias the fuel inlet against the floor of the fuel tank.

The support arm assembly may also comprise a fuel level sender for measuring the level of fuel in the fuel tank. The fuel level sender may have a sender arm float. The support foot may be suitable for supporting the fuel level sender unit at a predetermined height above the floor of the fuel tank. The support foot may support the fuel level sender unit at a suitable height to maintain the sender arm float off of the floor of the fuel tank. The guide member may bias the fuel transfer tube away from the sender arm float.

The support foot may be provided at a proximal or distal end of the support arm.

The support foot could be adapted to attach itself to the fuel tank. However, this is not essential and the support foot may rest on or against the fuel tank without being attached. A detent or projection may be formed in the fuel tank for cooperating with the support foot.

The support arm may be rigid and substantially inflexible. Flexing of the support arm may be reduced and this can facilitate reliable positioning of the support arm (and fuel level sender unit, if fitted) within the fuel tank.

According to another aspect of the present invention there is provided a support foot for mounting in a support arm assembly as described herein. The support foot can be formed from a resilient material. The support foot may further comprise a bracket suitable for mounting the support foot on the support arm. The bracket may be adapted to mount the support foot in a fixed orientation.

According to a further aspect of the present invention there is provided a fuel tank in combination with a support arm assembly as described herein.

According to a still further aspect of the present invention there is provided a kit for assembling a support arm assembly as described herein. The kit may comprise a support arm and at least one support foot. A plurality of support feet having different dimensions and/or material properties may be included in the kit. The different support feet could be interchangeable.

Within the scope of this application it is envisaged that the various aspects, embodiments, examples, features and alternatives set out in the preceding paragraphs, in the claims and/or in the following description and drawings may be taken independently or in any combination thereof. For example, features described in connection with one embodiment are applicable to all embodiments, unless there is incompatibility of features.

BRIEF DESCRIPTION OF THE DRAWINGS

Embodiments of the present invention will now be described, by way of example only, with reference to the accompanying figures, in which.

DETAILED DESCRIPTION

Figure 1:
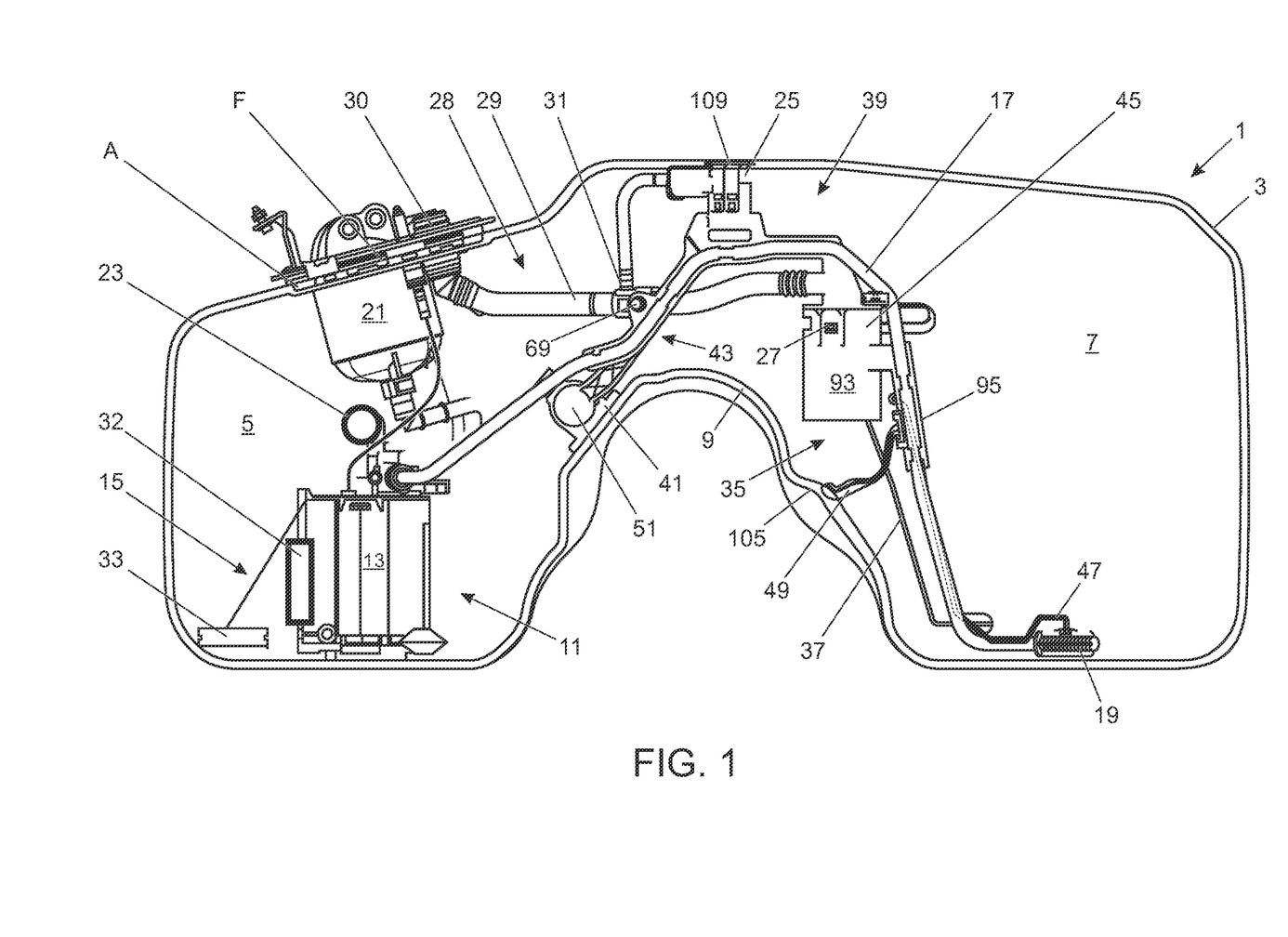
FIG. 1 shows a cross-sectional view of a fuel tank assembly having a mounting bracket and support arm according to an embodiment of the present invention.

The present invention relates generally to a fuel tank 1 for an automotive vehicle (not shown for clarity). A cross-section of the fuel tank 1 according to an embodiment is shown in FIG. 1.

Figure 9:
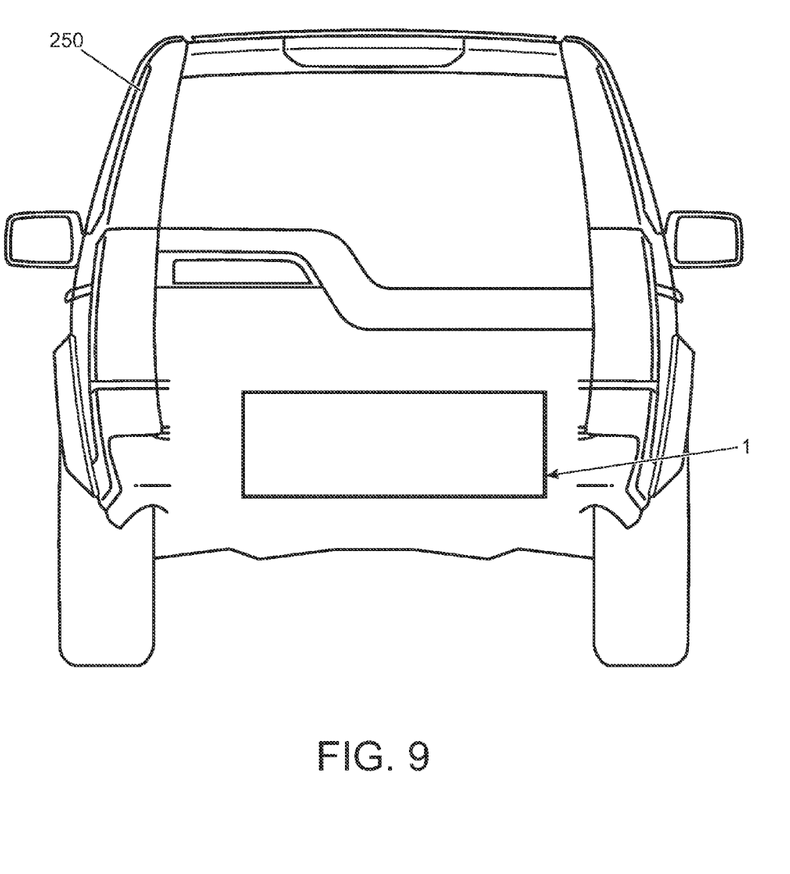
FIG. 9 schematically illustrates a fuel tank assembly supported on a vehicle.

The present invention relates generally to a fuel tank 1 for an automotive vehicle 250 as schematically shown in FIG. 9. A cross-section of the fuel tank 1 according to an embodiment is shown in FIG. 1.

A single chamber saddle-type fuel tank 1 is illustrated but the embodiments of the present invention described herein may find application with other types of fuel tank such as those having internal baffle plates. Furthermore, the illustrated fuel tank 1 could contain petrol (gasoline), diesel, bio-diesel, alcohol, and liquids other than those intended to act as fuels, such as fuel additives such as urea based solutions. For the sake of clarity, the present invention will be described with reference to petrol in the first instance.

The fuel tank 1 comprises a one-piece carcass 3 formed by extrusion blow-moulding using conventional techniques. The fuel tank 1 comprises a first (active) chamber 5 and a second (passive) chamber 7. A saddle 9 is formed between the first and second chambers 5, 7 but they remain in communication with each other. A fuel delivery module (FDM) 11 comprising an integrated fuel pump 13 and a first fuel level sender unit 15 is provided in the first chamber 5. A fuel transfer tube 17 (having a filter 19 at its distal end) is provided to enable fuel to be drawn from the second chamber 7 by the fuel pump 13. The fuel delivery module 11 also incorporates a filter module 21 mounted in a flange F sealingly located in an access aperture A formed in the carcass 3.

The fuel tank 1 further comprises an inlet check valve (ICV) 23, a roll over valve (ROV) 25 and a fill limit vent valve (FLVV) 27. The roll over valve 25 and the fill limit vent valve 27 are generally open and allow ventilation of the fuel tank 1. A breather line assembly 28 comprising a breather conduit 29 connects the fill limit vent valve 27 to a breather vent 30. The breather vent 30 is connected to a vapour canister, such as a charcoal canister (not shown), for the collection and discharge of fuel vapour into an engine inlet manifold (not shown) during operation. The roll over valve 25 is connected to the breather conduit 29 by a T-connector 31. The roll over valve 25 closes if the fuel tank 1 is inverted to prevent fuel escaping through the breather vent 30. The fill limit vent valve 27 closes when the level of the fuel in the fuel tank 1 reaches a maximum fill height. In alternate embodiments, the roll over valve 25 may be kept separate from the breather line assembly by connecting it to another port on the flange F of the fuel delivery module 11.

The first fuel level sender unit 15 comprises a first gauge module 32 and a first sender arm float 33 which pivots in response to changes in the level of the fuel in the first chamber 5. A second fuel level sender unit 35 is provided for monitoring the level of the fuel in the second chamber 7. The second fuel level sender unit 35 comprises a second gauge module (not shown) and a second sender arm float 37 which pivots in response to changes in the level of the fuel in the second chamber 7.

A support arm assembly 39 is provided to support the second fuel level sender unit 35 along with the roll over valve 25 and the fill limit vent valve 27. The support arm assembly 39 is pivotally mounted on a bracket 41 (described below) fixedly attached to an inside wall of the carcass 3. The support arm assembly 39 has a modular construction and comprises a cross over arm 43, a collar shroud 45 (which at least partially surrounds the fill limit vent valve 27), a transfer tube support member 47 and a resilient support foot 49.

Figure 2A:
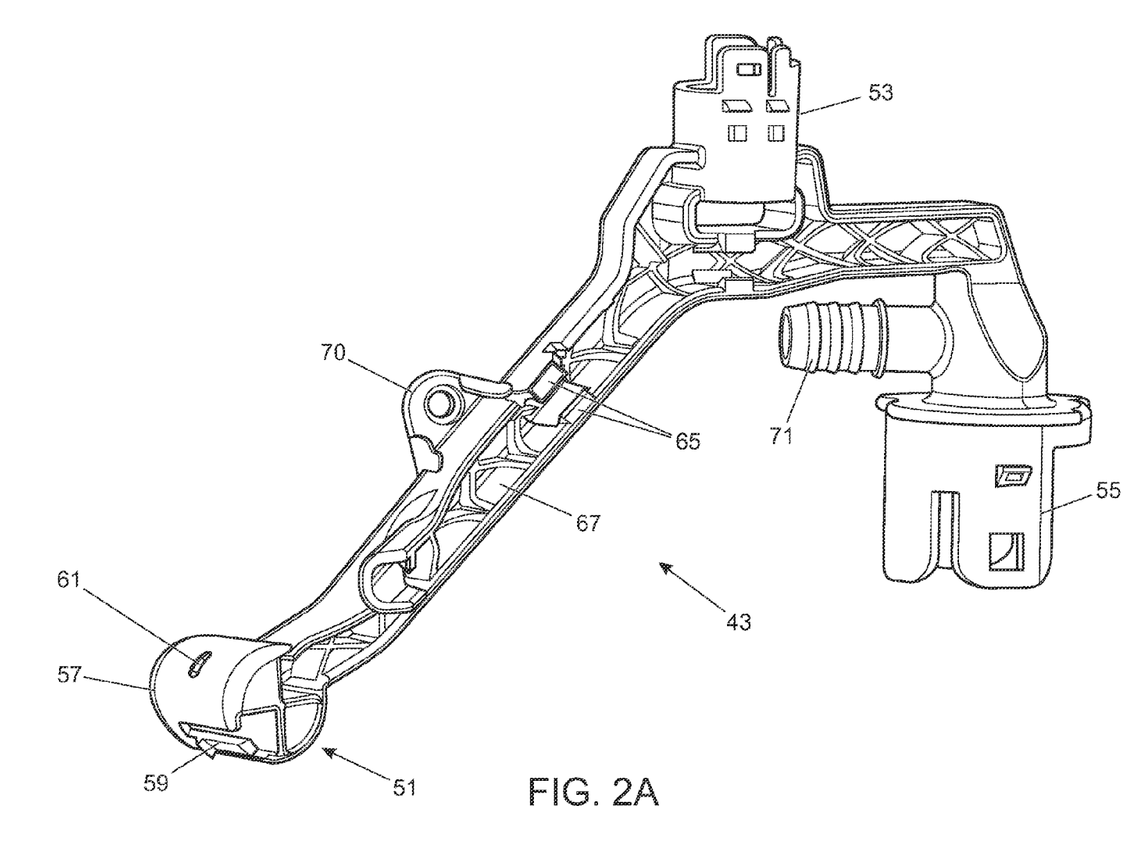
FIGS. 2A and 2B show first and second perspective views of the cross over arm according to an embodiment of the present invention.
Figure 2B:
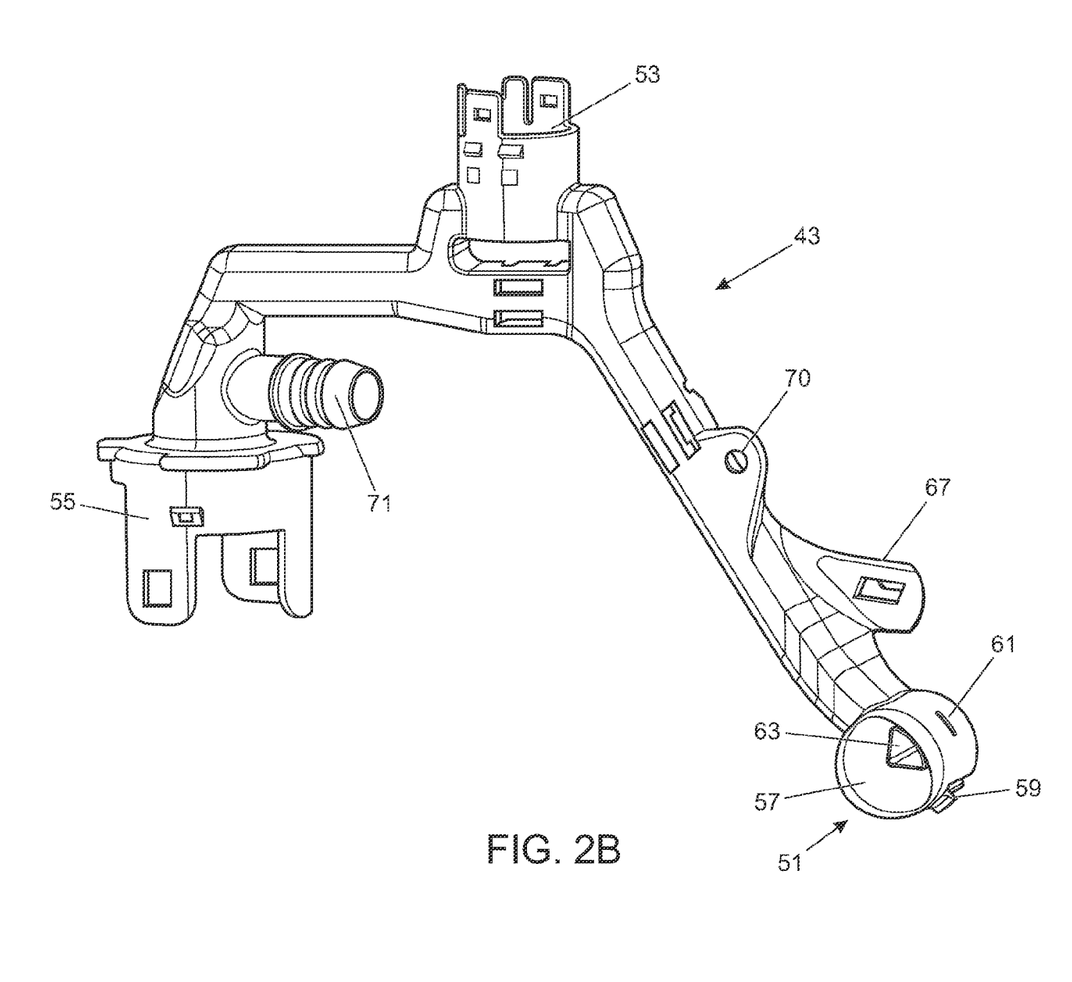

As shown in FIGS. 2A and 2B, the cross over arm 43 is a one-piece moulding comprising a cylindrical mounting barrel 51, a first valve housing 53 and a second valve housing 55.

The barrel 51 is provided at a proximal end of the cross over arm 43 to pivotally mount the support arm assembly 39 in the mounting bracket 41. The barrel 51 has a longitudinal axis X (extending perpendicular to the plane of the page in FIG. 1 and shown in FIG. 4) about which the cross over arm 43 can pivot. A first end 57 of the barrel 51 has a tapered or rounded profile to facilitate location of the barrel 51 in the bracket 41. A resilient latching member 59 is provided on the barrel 51 to engage the bracket 41. An elongated slot 61 is formed in the barrel 51 to receive a locking screw 52, or other mechanical fastener, to lock the cross over arm 43 in the bracket 41. A collection chamber 63 is formed in the barrel 51 (see FIG. 3).

The cross over arm 43 has a series of transfer tube clips 65 provided along a first guide channel 67 to retain the fuel transfer tube 17. A breather line clip 69 (shown in FIG. 1) is mounted on a flange 70 provided on the cross over arm 43 to support the breather line assembly 28.

The first valve housing 53 is located at the top of the cross over arm 43 to house the roll over valve 25. The second valve housing 55 is provided at the distal end of the cross over arm 43 to house the fill limit vent valve 27. A first port 71 for connection to the breather conduit 29 is moulded in the cross over arm 43 proximal the second valve housing 55. The first port 71 is in fluid communication with the second valve housing 55 to connect the fill limit vent valve 27 with the breather vent 30. A second port could optionally be provided for connection to the roll over valve 25 in place of the T-connector 31. As noted above, the roll over valve 25 and the fill limit vent valve 27 may have separate connections to the flange 22 of the fuel delivery module 11.

Figure 4:
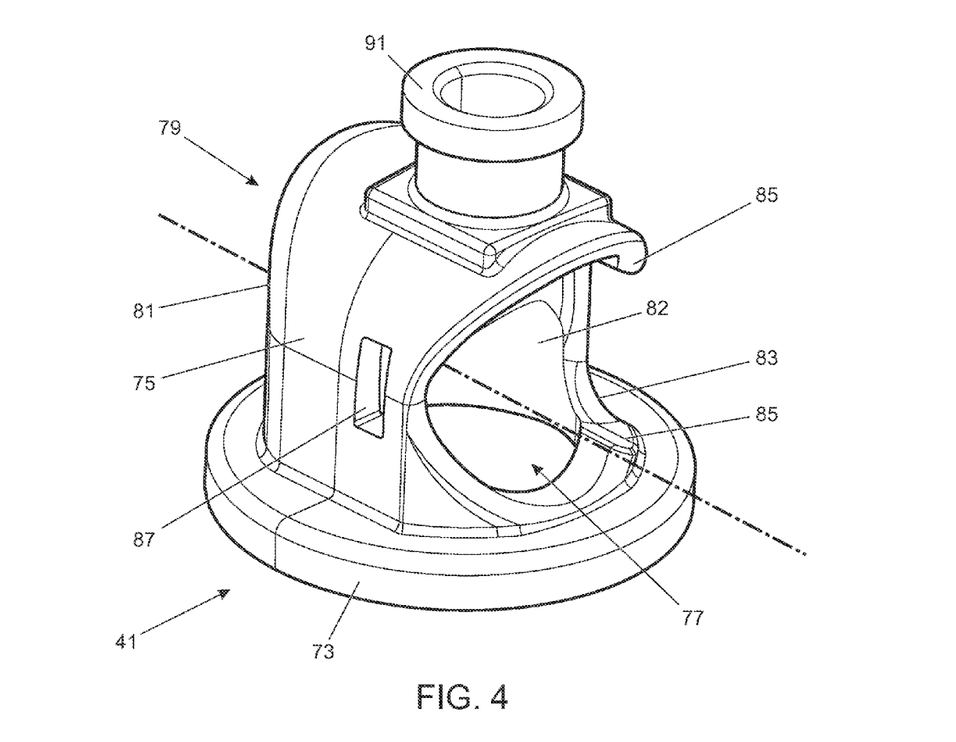
FIG. 4 shows a perspective view of the mounting bracket.

As shown in FIG. 4, the bracket 41 is a one-piece moulding comprising a base plate 73 and a mounting sleeve 75. The base plate 73 is adapted to be permanently attached to the sidewall of the carcass 3. In the present embodiment, the base plate 73 is hot plate welded to the saddle 9 of the fuel tank.

As shown in FIG. 4, the sleeve 75 is open at a first end 77 to allow the insertion of the barrel 51. A second end 79 of the sleeve 75 is closed by an end wall 81 profiled to match the first end 57 of the barrel 51. The sleeve 75 has an internal cylindrical bearing surface 82 which matches the outer surface of the barrel 51. The sleeve 75 thereby forms a socket to pivotally mount the support arm assembly 39.

The first end 77 of the sleeve 75 defines a collar 83 for limiting the pivoting motion of the cross over arm 43. As shown in FIG. 4, two protuberances 85 formed on the collar 83 define stops to limit angular rotation about the longitudinal axis X.

A slot 87 is formed in the sleeve 75 to receive the resilient latching member 59 when the barrel 51 is introduced into the sleeve 75. To secure the barrel 51 in the sleeve 75 the locking screw 52 is introduced through an aperture 89 in the bracket 41. A guide 91 (shown in FIG. 3) is optionally formed on an outer surface of the bracket 41 to support the locking screw 52 (shown in section in FIG. 3) as it is screwed into the bracket 41. The locking screw 52 locates in the elongated slot 61 in the elongate barrel 51 to enable rotation of the support arm assembly 39 about the longitudinal axis X. The locking screw 52 can abut each end of the elongated slot 61 to limit the pivoting motion of the cross over arm 43. The locking screw 52 may be captive within the bracket 41 to facilitate installation.

Figure 3:
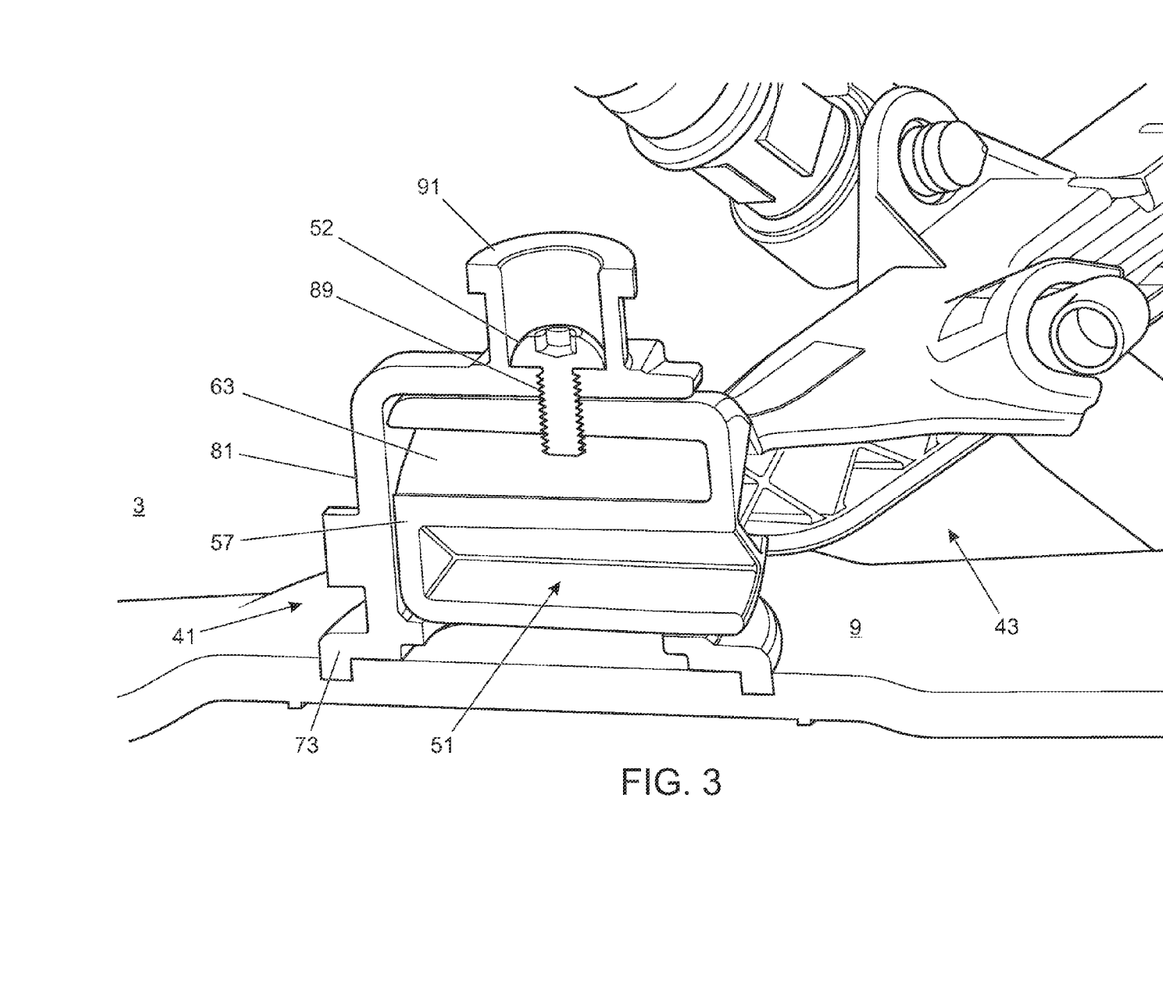
FIG. 3 shows a sectioned view of the mounting bracket and support arm according to an embodiment of the present invention.

In the present embodiment, the locking screw 52 is a thread-cutting screw. As the locking screw 52 is introduced into the bracket 41, swarf may be created as a screw thread is cut into the bracket 41. This swarf collects in the chamber 63 in the barrel 51 and is trapped therein since the chamber 63 is closed by the end wall 81 of the sleeve 75, as shown in FIG. 3. The swarf is thereby prevented from entering the body of the fuel tank 1.

Figure 5:
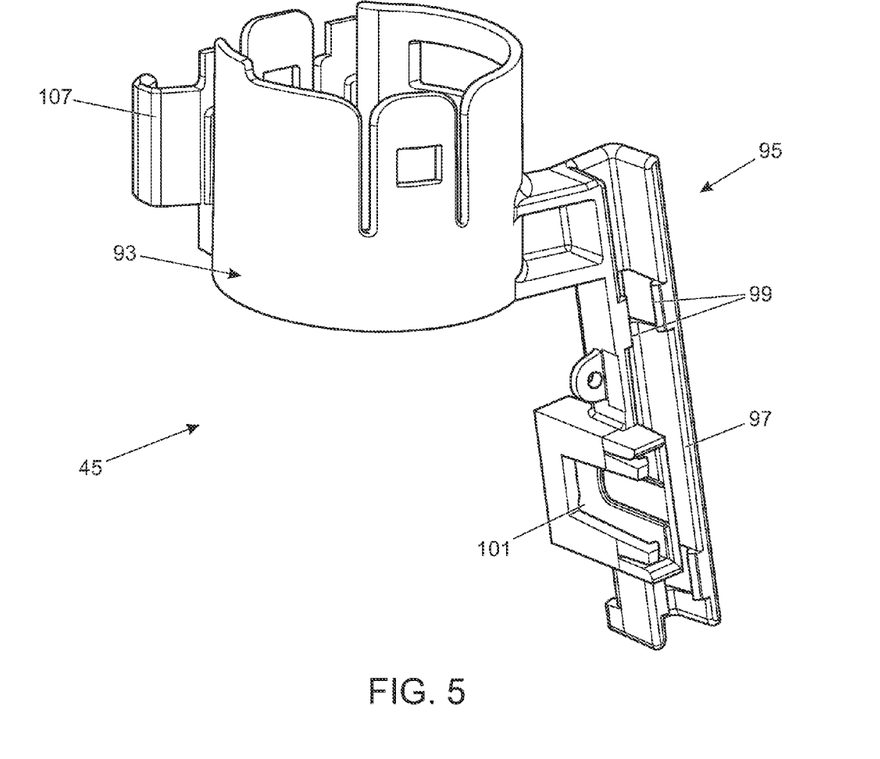
FIG. 5 shows a perspective view of the collar shroud mounted on the cross over arm of an embodiment of the present invention.

As shown in FIG. 5, the collar shroud 45 comprises a shroud 93 and a guide member 95. The shroud 93 locates over the second valve housing 55 to mount the collar shroud 45 on the distal end of the cross over arm 43. The fill limit vent valve 27 is housed within the shroud 93.

A second guide channel 97 is formed in the guide member 95 and the fuel transfer tube 17 is secured in the second guide channel 97 by a set of transfer tube clips 99. The support member 47 is a resilient wire member which extends from the guide member 95 and is attached to the filter 19. The support member 47 and the guide member 95 position the end of the fuel transfer tube 17 at the bottom of the second chamber 7 of the fuel tank 1.

Figure 6:
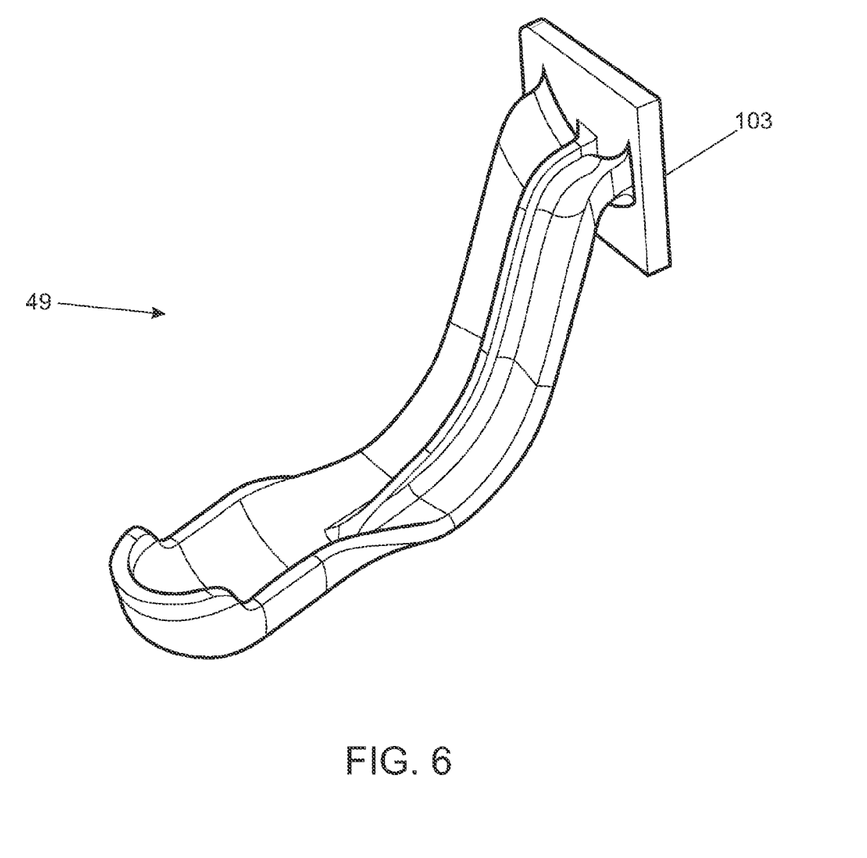
FIG. 6 shows a perspective view of a resilient foot for supporting the cross over arm of an embodiment of the present invention.

A perspective view of the support foot 49 is shown in FIG. 6. The guide member 95 has a first clip fastener 101 for receiving a retaining plate 103 to releasably mount the support foot 49. The support foot 49 is moulded from a resilient plastics material and locates in a cooperating formation or detent 105 formed in the sidewall of the carcass 3. In use, the support foot 49 biases the support arm assembly 39 to a predetermined orientation within the fuel tank 1. The support foot 49 sets the height of the fill limit vent valve 27 and, therefore, the effective volume of the fuel tank 1.

The support foot 49 could be formed integrally with the guide member 95. However, by mounting the support foot 49 in the first clip fastener 101 a modular design can be implemented to allow the support arm assembly 39 to be tailored to suit different applications. For example, by changing the dimensions of the support foot 49, the height of the fill limit vent valve 27 within the fuel tank 1 can be altered.

The second gauge module of the second fuel level sender unit 35 is removably mounted on the side of the collar shroud 45 by a second clip fastener 107. It will be appreciated that the second fuel level sender unit 35 could be integrated into the collar shroud 45 and/or the cross over arm 43.

The assembly of the support arm assembly 39 and its installation in the fuel tank 1 will now be described. The carcass 3 is formed using conventional techniques and the aperture A is cut in a sidewall. Using the aperture A for access, the bracket 41 is hot plate welded directly onto an inside wall of the carcass 3. The bracket 41 in the present embodiment is attached to the saddle 9 and faces the aperture A to provide improved accessibility. Thus, the bracket 41 is mounted remote from the aperture A and the operational loads around the aperture A and applied to the flange F may be reduced.

The support arm assembly 39 is assembled by mounting the roll over valve 25 and the fill limit vent valve 27 on the cross over arm 43. The collar shroud 45 is then positioned around the fill limit vent valve 27; and the second fuel level sender unit 35 (along with the second sender arm float 37) is mounted on the collar shroud 45. The support foot 49 is attached to the guide member 95 by the first clip fastener 101.

The fuel transfer tube 17 is inserted into the first and second guide channels 67, 97 formed in the cross over arm 53 and the guide member 95 respectively. The transfer tube clips 65, 99 retain the fuel transfer tube 17 in position. The breather conduit 29 is attached to the first port 71 and mounted on the cross over arm 43 by the breather line clip 69. The roll over valve 25 is connected to the breather conduit 29 via the T-connector 31.

The support arm assembly 39 is U-shaped so as to extend over the saddle 9 when positioned in the fuel tank 1. The assembled support arm assembly 39 can be inserted through the aperture A and installed in the fuel tank 1 without deforming the cross over arm 43 or the guide member 95. Thus, the support arm assembly 39 can have a fixed geometry.

The support arm assembly 39 is positioned in the fuel tank 1 such that the second fuel level sender unit 35 and the distal end of the fuel transfer tube 17 are disposed in the second chamber 7. By supporting the fuel transfer tube 17 along its length, the support member 47 and the guide member 95 help to prevent entanglement with the second sender arm float 37 which might obstruct or prevent movement of the second arm float 37.

The roll over valve 25 is positioned at the top of the fuel tank 1. A cap 109 may optionally be provided on the roll over valve 25 to contact the roof of the fuel tank 1. The second fuel level sender unit 35 and the collar shroud 45 are located in the second chamber 7. The support foot 49 is then located in the detent 105 formed in the sidewall of the saddle 9 and the barrel 51 inserted into the mounting bracket 41. The latching member 59 on the barrel 51 locates in the slot 87 in the bracket 41 to temporarily secure the cross over arm 53. In the example shown in the Figures, the latching member 59 is arranged to secure the arm assembly by means of a snap-fit configured to provide an audible and/or tactile indication to the assembly operator that the support arm assembly 39 is properly located. The locking screw 52 is then screwed into the aperture 89 in the bracket 41 to secure the support arm assembly 39. The fuel delivery module 11 and the filter module 21 are then installed and the assembly of the fuel tank 1 completed in conventional manner.

As outlined above, the support arm assembly 39 can rotate about the longitudinal axis X. In use, the carcass 3 may flex due to external loading, for example if the vehicle in which the fuel tank 1 is installed travels over rough terrain. The pivotal coupling between the bracket 41 and the support arm assembly 39 can accommodate any such flexing of the fuel tank 1. Moreover, any loads applied to the fuel tank 1 are not transferred directly to the mounting block 41 since the support arm assembly 39 can pivot within the fuel tank 1. This arrangement can enhance durability and reliability of the fuel tank assembly in use.

The support foot 49 biases the support arm assembly 39 towards a predetermined position/orientation within the fuel tank 1. Thus, movement of the fuel tank 1 does not affect the supply of fuel from the fuel tank 3 since the fuel transfer tube 17 remains in substantially the same position. The support foot 49 also helps ensure that the second fuel level sender unit 35 remains at a predetermined height within the fuel tank 1. The support foot 49 may bias the roll over valve 25 against the roof of the fuel tank 1.

The breather line clip 69 supports the breather conduit 29 in a substantially horizontal position. This helps prevent the formation of troughs (so-called U-traps) in the breather conduit 29 where fuel may collect resulting in premature cut-off when the fuel tank 3 is being filled.

The fuel tank 1 has been described with particular reference to petrol (gasoline). It will be appreciated that modifications could be made to render the fuel tank 1 suitable for diesel fuel, alcohol, or a liquid not intended to act as a fuel, for example a fuel additive such as an urea solution. The equivalent diesel fuel tank 1 would incorporate a diesel delivery module (DDM) in place of the fuel delivery module 11. Also, the fuel tank 1 would be vented to the fuel filler cap (not shown) rather than a charcoal canister or the like. Accordingly, the roll over valve 25 can be omitted for diesel applications and a cap 109 provided to contact the roof of the fuel tank 1.

Figure 7A:
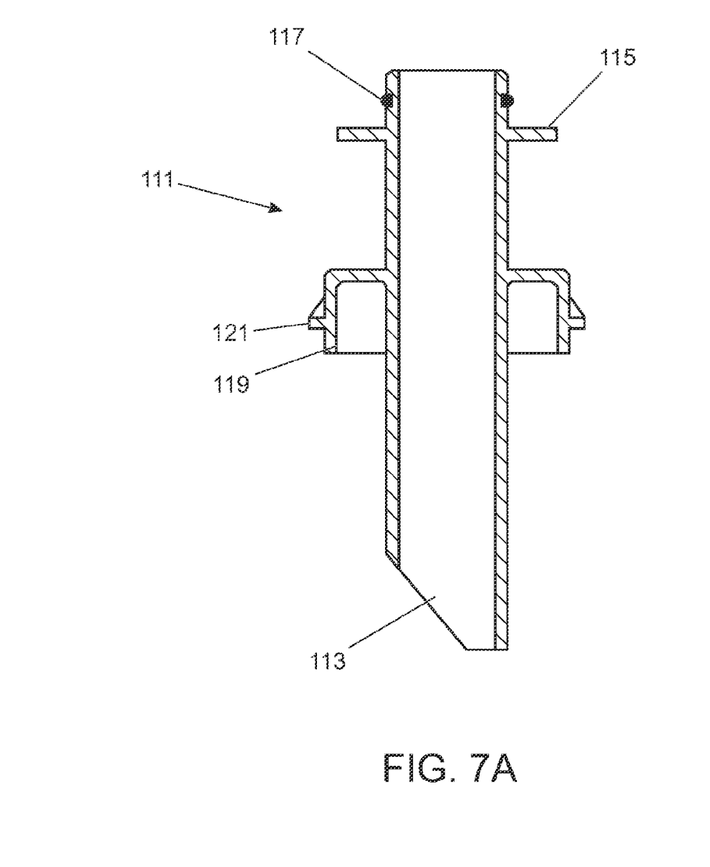
FIGS. 7A and 7B show a cross-sectional view and a perspective view of an insert for a diesel fuel system.
Figure 7B:
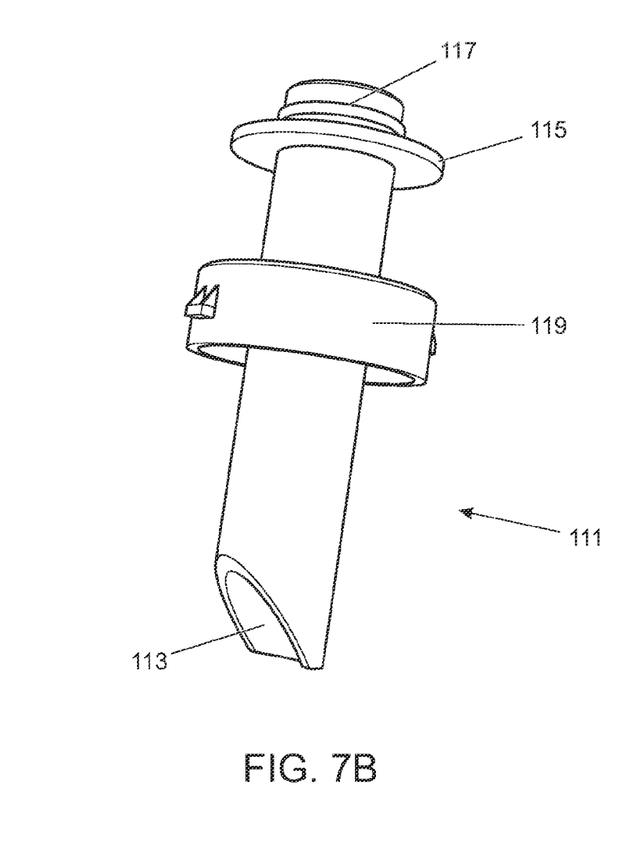

A further optional modification for diesel systems would be to omit the fill limit vent valve 27. Instead, the fill limit of the fuel tank 1 would be controlled by a tubular insert 111 located inside the shroud 93 to replace the fill limit vent valve 27. As shown in FIGS. 7A and 7B, an inclined opening 113 is formed at the bottom of the insert 111 to place the interior of the fuel tank 1 in communication with the breather vent 30 via the breather conduit 29. The top of the insert 111 locates inside the second casing 55 and a circumferential flange 115 abuts the top of the second casing 55. An O-ring 117 is provided around the top of the insert 111 to form a seal with the breather line assembly 28. An external collar 119 is formed on the insert 111 and a pair of latching members 121 cooperates with complementary slots (not shown) in the shroud 93 to secure the insert 111.

Figure 8:
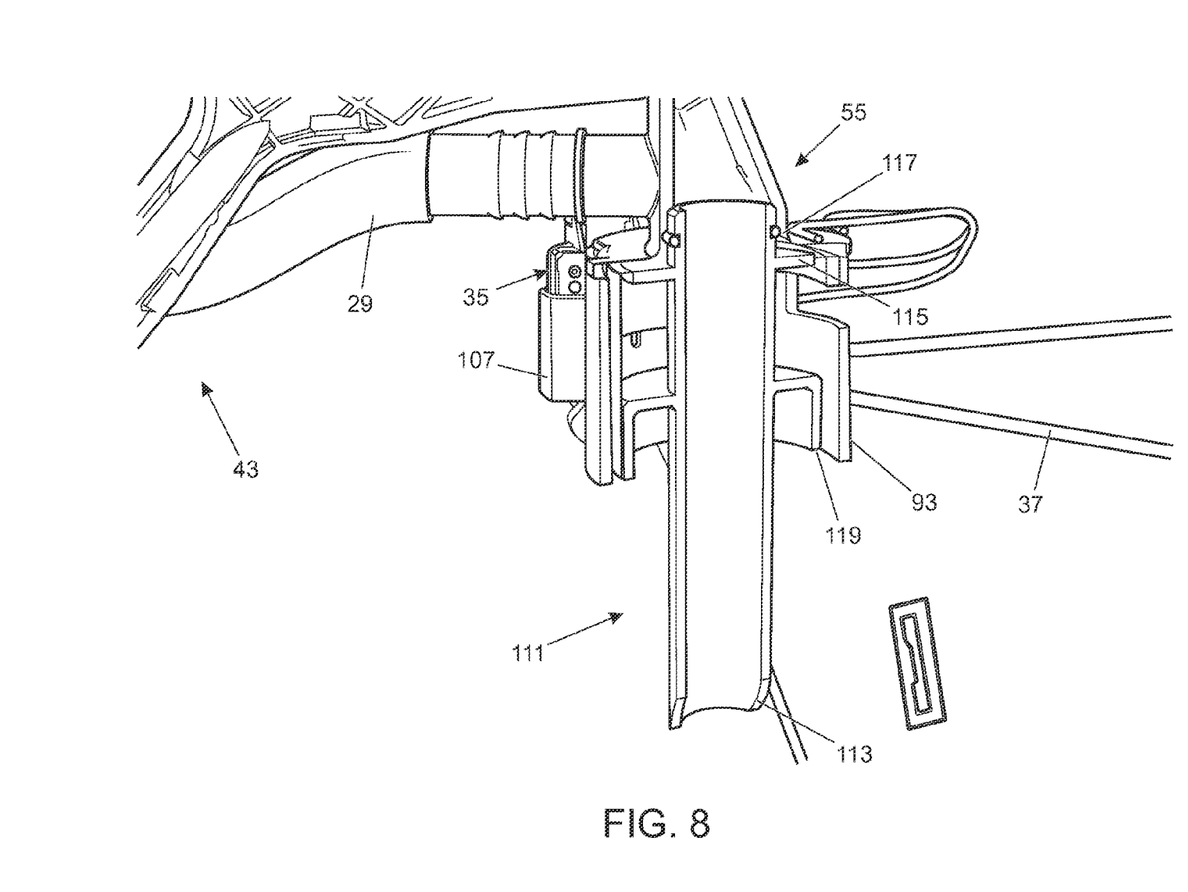
FIG. 8 shows the insert of FIGS. 7A and 7B installed in the collar shroud.

A cross-sectional view of the insert 111 installed in the collar shroud 45 of the support arm assembly 39 is shown in FIG. 8. In use, when the fuel within the fuel tank 1 covers the opening 113, the air above the fuel in the carcass 3 can no longer vent through the breather vent 30. The carcass 3 is thereby effectively sealed and the continued supply of fuel causes an increase in pressure within the fuel tank 1. The increased pressure causes the fuel dispenser to cut off and the supply of fuel to the fuel tank 1 to be stopped. The closure of the opening 113 in the insert 111 by the fuel in the fuel tank 1 is thereby equivalent to the closing of the fill limit vent valve 27. It will be appreciated that the height of the opening 113 in the fuel tank 1 determines the fill limit.

A similar result may be achieved without providing a tubular insert 111. Instead, the shroud 93 can by extended downwardly to the desired height within the fuel tank 1. Once the fuel within the fuel tank 1 covers the bottom of the shroud 93 the breather line assembly 28 is closed and the fuel tank 1 is effectively sealed. The resulting increase in pressures causes the fuel dispenser to cut off and thereby limit supply of fuel to the fuel tank 1. These modifications are believed to be independently patentable and are the subject of a co-pending application.

It will be appreciated that various changes and modifications may be made without departing from the scope of the present invention. For example, the roll over vent 25 and the fill limit vent valve 27 could be over moulded into the support arm assembly 39. Likewise, the fuel transfer tube 17 could be integrally formed in the support arm assembly 39, for example using gas-assisted moulding.

The invention claimed is:

1. A support arm assembly for mounting in a fuel tank, the support arm assembly comprising:
   a support arm carrying a fuel transfer tube for transferring fuel to a fuel pump, the fuel transfer tube being supported by the support arm along at least a portion of a length of the fuel transfer tube between first and second ends of the fuel transfer tube; and
   a support foot configured to cooperate with the fuel tank to support the support arm at a predetermined position within the fuel tank, wherein the support foot is spring-biased and is configured to bias the support arm assembly against a roof of the fuel tank and substantially prevent transferal of operational loads from the fuel tank to the support arm.

2. A support arm assembly as claimed in claim 1, wherein said support foot is formed from a resilient material.

3. A support arm assembly as claimed in claim 1, wherein said support arm comprises a connector for pivotally mounting the support arm assembly in the fuel tank.

4. A support arm assembly as claimed in claim 1, comprising a retainer for mounting the support foot on said support arm in a fixed orientation.

5. A support arm assembly as claimed in claim 4, wherein said retainer comprises a resilient fastener or a mechanical fastener.

6. A support arm assembly as claimed in claim 1, wherein said support foot is releasably mounted on the support arm.

7. A support arm assembly as claimed in claim 1, wherein said support foot is arranged operatively to engage a sidewall of the fuel tank.

8. A support arm assembly as claimed in claim 1, wherein said support foot has a curved contact surface for engaging the fuel tank.

9. A support arm assembly as claimed in claim 1, comprising a fuel level sender unit having a sender arm float.

10. A support arm assembly as claimed in claim 9, wherein the support foot is configured for supporting the fuel level sender unit at a predetermined height within the fuel tank.

11. A support arm assembly as claimed in claim 1, comprising a bracket for mounting the support foot on the support arm in a fixed orientation and wherein the support foot is formed from a resilient material.

12. A fuel tank comprising a support arm assembly, the support arm assembly comprising:
   a support arm carrying a fuel transfer tube for transferring fuel to a fuel pump, the fuel transfer tube being supported by the support arm along at least a portion of a length of the fuel transfer tube between first and second ends of the fuel transfer tube; and a support foot configured to cooperate with the fuel tank to support the support arm at a predetermined position within the fuel tank, wherein the support foot is spring-biased and configured to bias the support arm assembly against a roof of the fuel tank and substantially prevent transferal of operational loads from the fuel tank to the support arm.

13. A fuel tank as claimed in claim 12, wherein the support foot is made from a resilient material.

14. A fuel tank as claimed in claim 12, wherein said support arm comprises a connector for pivotally mounting the support arm assembly in the fuel tank.

15. A fuel tank as claimed in claim 12, comprising a retainer for mounting the support foot on said support arm in a fixed orientation.

16. A fuel tank as claimed in claim 12, wherein said support foot is releasably mounted on the support arm.

17. A fuel tank as claimed in claim 12, wherein said support foot is arranged operatively to engage a sidewall of the fuel tank.

18. A fuel tank as claimed in claim 12, wherein said support foot has a curved contact surface for engaging the fuel tank.

19. A vehicle, comprising:
  a fuel tank;
  a fuel transfer tube for transferring fuel to a fuel pump;
  a support arm assembly in the fuel tank, the support arm assembly including
    a support arm carrying the fuel transfer tube, the fuel transfer tube being supported by the support arm along at least a portion of a length of the fuel transfer tube between first and second ends of the fuel transfer tube, and
    a support foot configured to cooperate with the fuel tank, the support foot supporting the support arm in a predetermined position in the fuel tank, the support foot being spring-biased and configured to bias the support arm against an upper surface of the fuel tank and substantially prevent transferal of operational loads from the fuel tank to the support arm.

* * * * *